United States Patent [19]
Puri

[11] 3,883,802
[45] May 13, 1975

[54] PROCESS FOR STRESS TESTING FET GATES WITHOUT THE USE OF TEST PATTERNS

[75] Inventor: Yogishwar Kumar Puri, Vienna, Va.

[73] Assignee: International Business Machines Corporation, Armonk, N.Y.

[22] Filed: Dec. 14, 1973

[21] Appl. No.: 425,042

[52] U.S. Cl. ............................................. 324/73 R
[51] Int. Cl. ............................................. G01r 31/26
[58] Field of Search ............................. 324/73, 158

[56] References Cited
UNITED STATES PATENTS

| | | | |
|---|---|---|---|
| 3,286,175 | 11/1966 | Gerbier et al. | 324/73 |
| 3,621,387 | 11/1971 | Smith et al. | 324/73 |
| 3,736,506 | 5/1973 | Griffin | 324/158 D |

Primary Examiner—Alfred E. Smith
Assistant Examiner—Rolf Hille
Attorney, Agent, or Firm—Joseph C. Redmond, Jr.

[57] ABSTRACT

A testing process is described for stress testing each gate electrode in a dynamic random logic FET circuit array incorporated in an LSI device. The process comprises the steps of providing operating potentials and clock signals to each logic circuit in a logic path in the LSI device; providing a stress voltage to each initial logic element in a logic path, and sequencing the clock signals to each logic circuit in reverse order to that sequence required to transfer information through a logic path to perform the circuit logic function. The invention advantageously utilizes the fact a reverse clock will sequentially stress each logic circuit while in a discharge state and the other logic circuits are in a non-conducting condition.

7 Claims, 6 Drawing Figures

FIG. 3   SET OF GROUND RULES
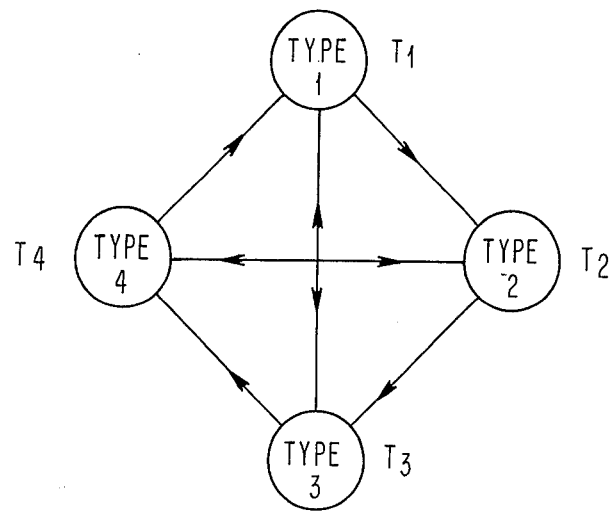
FIG. 4
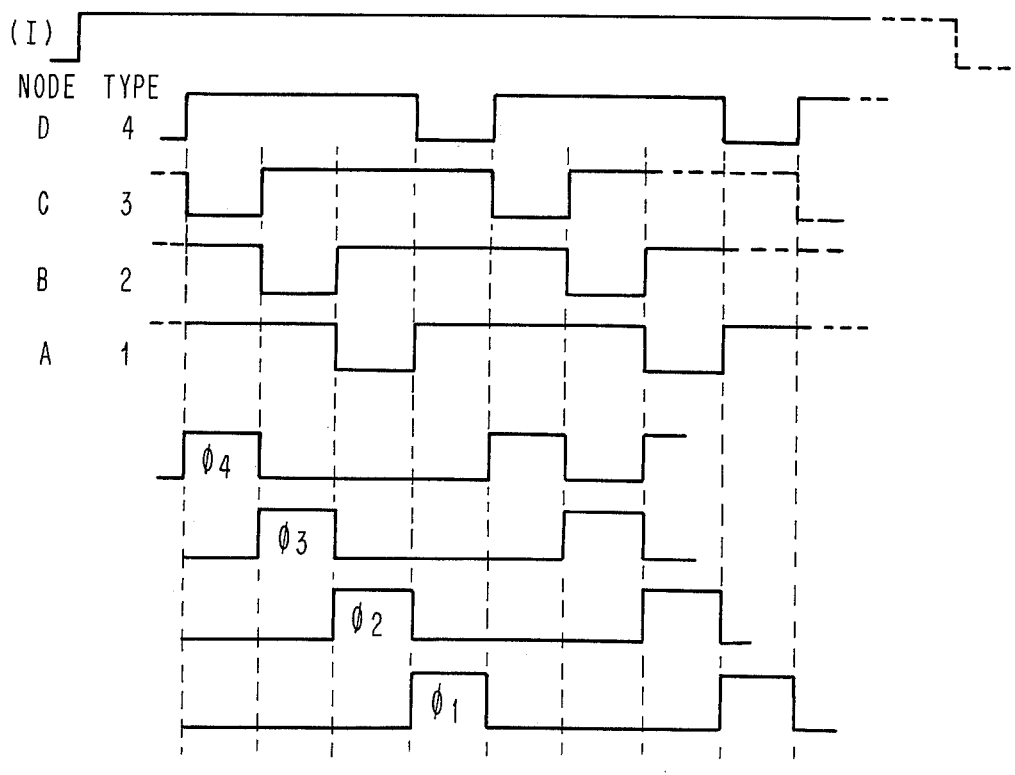

PROCESS FOR STRESS TESTING FET GATES WITHOUT THE USE OF TEST PATTERNS

BACKGROUND OF THE INVENTION

1. Field of the Invention

This invention relates to processes for testing large scale integrated devices. More particularly, the invention relates to stress testing gate electrodes for field effect transistor (FET) devices in dynamic random logic circuits.

2. Description of the Prior Art

LSI devices incorporate hundreds of circuits and thousands of bipolar or field effect transistors in a semiconductor. Functional and parametric testing are performed on the device before acceptance for use. Functional and parametric testing are described in an article entitled "An Introduction to IC Testing" by F. Vanhein, IEEE Spectrum, December 1971, pages 28–37. One test for field effect transistor devices is to stress the gate insulation to determine whether the device has failed by the gate electrode being shorted to the substrate. Typically, the test is a series of test patterns applied to gate electrodes through the input/output (I/O) terminals of the LSI device. The amplitude of each test pattern is raised to a peak level. The number of test patterns and the peak level are under computer control. Once the stress test is completed, a functional test is performed on the LSI device. If the results of the functional test indicate that neither logic nor amplitude are in error, the LSI device is known to have satisfactory met stress requirements as well.

As more and more field effect transistors are incorporated in a device, test patterns must be increased to insure that each FET gate is stressed. An extensive number of test patterns increases the time for testing a device. Ultimately, the density of the transistors and circuits in a LSI device is limited by the number of testing patterns; input/output terminal pins, and testing time. A testing process that over comes these obstacles will simplify the manufacture of LSI devices employing field effect transistors and increase the reliability of shipped devices.

SUMMARY OF THE INVENTION

An object of the invention is a process that simplifies the testing of LSI devices.

Another object is a testing process that stresses gate insulations of field effect transistors in a predictable and repeatable mode.

Another object is a process of stressing gate insulations of field effect transistors in a manner which corresponds to actual field application.

Another object is a process of testing gate insulation for field effect transistors in LSI devices without the use of test patterns and in a known duty cycle.

In one form, an LSI device is adapted to perform dynamic random logic, i.e., combinatorial and/or sequential through one or more chains of FET logic circuits, the chains of logic circuits being arranged into one or more logic paths. Information is passed through each logic path by a set of alternating phases or clock pulses, typically four being turned on/off in a sequence, i.e., $\phi 1, \phi 2, \phi 3$ and $\phi 4$. Operating voltages $V_{DD}$ and $V_{GG}$ for each of the circuits are supplied as a first input to the device. A stressing voltage is applied as an input to each logic path in the device. The stressing voltage provides a peak level which the gate insulation for the initial field effect transistor in a logic path should withstand without breakdown. The clock voltages are supplied as another input to the device. The clock voltages are in reverse order to the normal order for passage of information through a logic path. The reverse order of the clock signals operates to sequentially discharge and simultaneously stress the gate insulation of each logic circuit in a path. Each clock cycle accesses and stresses the gate insulation of all FET logic circuits in the device. No test patterns are required to stress each logic circuit. The duty cycle of stressing a logic circuit is equal to the reciprocal of the number of clock pulses.

A feature of the invention is that the gates of all FET devices in the device are stressed in a predictable and repeatable mode.

Another feature of the invention is that the duty cycle of stressing is known and the manner of stressing is typical of field application.

Another feature is that each LSI device shipped to a customer has a high degree of reliability, due to 100 percent stressing of all field effect transistors.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 3 is a diagram for connecting different dynamic logic circuits together to perform random logic functions.

FIG. 4 is a timing diagram for the input signals supplied to the logic circuit shown in FIG. 2.

DESCRIPTION OF PREFERRED EMBODIMENT 1.0—Dynamic FET Logic Circuits

Dynamic FET logic comprises logic elements that are activated by a clock pulse and operate from either a fixed supply voltage or a clock voltage. U.S. Pat. No. 3,648,066 is an example of a dynamic FET logic circuit employed in a shift register.

Figure 2:
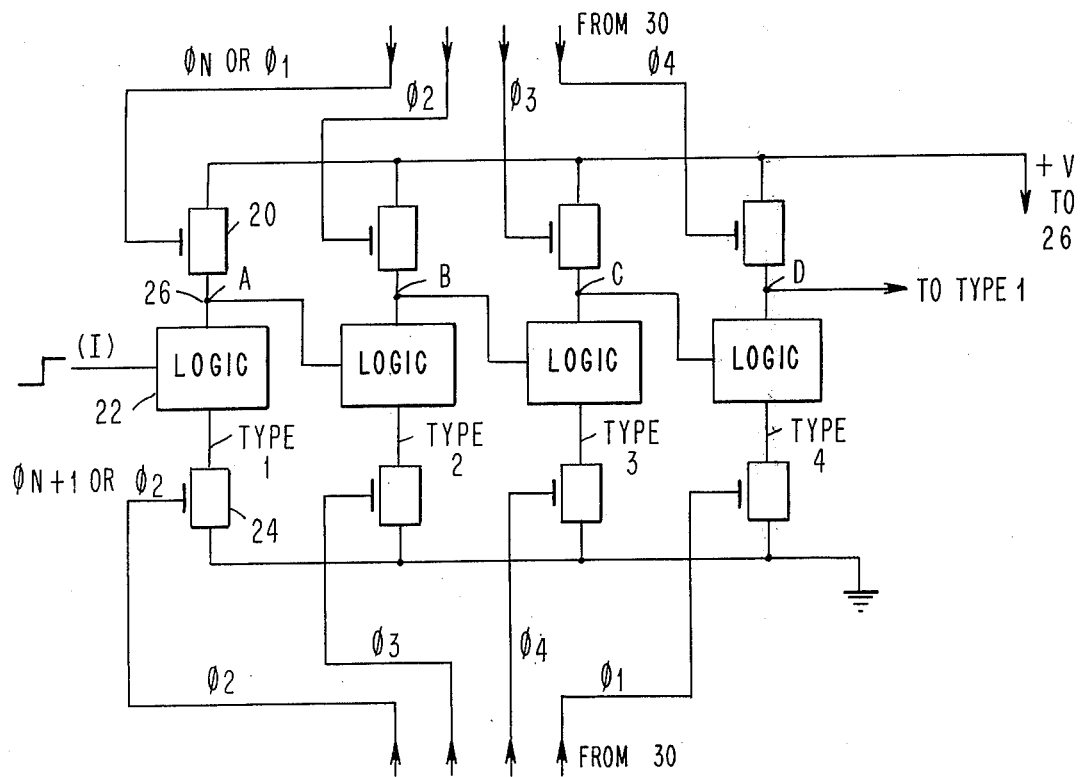
FIG. 2 is a circuit schematic of a portion of an FET logic path incorporated in a LSI device.

Typically, as shown in FIG. 2, a dynamic logic element comprises a precharged FET device 20, a combinatorial logic circuit 22, e.g., an FET and/or circuit, an FET discharge device 24 and an output node 26. The logic element may be connected between a fixed voltage +V and a reference voltage ground or the ends of the circuit may be connected to a clock supply ($\phi_N$). The clock inputs $\phi_N$ and $\phi_{N+1}$ are provided to the devices 20 and 24, respectively. Data or logic signals are provided as inputs to the combinatorial logic circuit 22. These inputs may be outputs from the nodes 26 of other logic circuits. Data or information is transferred through a series or array of logic circuits by providing different clock phases to each logic circuit. Typically, four clock phases are distributed in sets among four logic elements. The sets of clock phases form logic circuit types as described below in Table I.

TABLE I

| TYPE | PRECHARGE φ | DISCHARGE φ |
| --- | --- | --- |
| 1 | $\phi_1$ | $\phi_2$ |
| 2 | $\phi_2$ | $\phi_3$ |
| 3 | $\phi_3$ | $\phi_4$ |
| 4 | $\phi_4$ | $\phi_1$ |

The four types of logic circuits may be interconnected to a set of ground rules to construct a complex random logic functions, e.g., combinatorial, sequential or both. The ground rules dictate what circuit types can drive aother types. A commonly used set of ground rules is shown in FIG. 3. The four types of logic circuits are described in Table I. The arrowed connections between the types indicate cascade relation for correct transfer of data in a random logic chain. Type 1 can drive either a type 2 and/or type 3. A type 2 can drive either a type 3 and/or type 4. Types 3 and 4 operate in a similar manner to types 1 and 2.

When hundreds of such random logic circuits are embodied in a LSI device with only a small number of input/output pins a mammoth number of test patterns is required at the chip inputs to access each and every logic input gate. The total number of test patterns is a function of the number of device inputs and the number of sequential circuits inside the device. To stress all gates inside the device while the four clocks are running, therefore, requires a memory adapted to store several million bit test patterns. The present invention over comes the need for test patterns and the storage of patterns in memory.

2.0—Stress Testing Dynamic FET Random Logic Circuits

Figure 1:
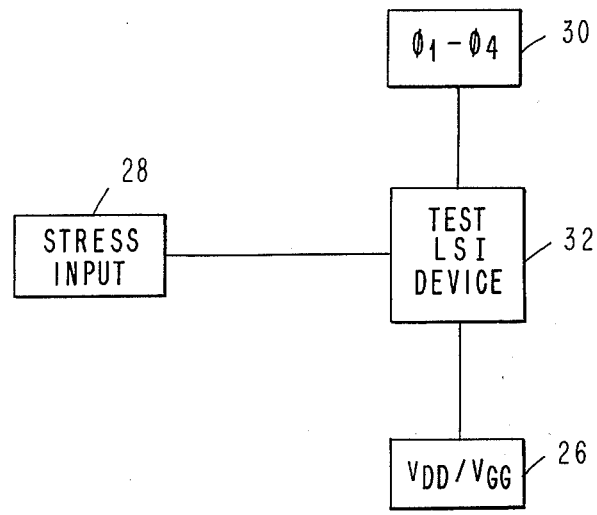
FIG. 1 is a schematic of a system which employs the principles of the invention.

FIG. 1 shows the apparatus that is employed in practicing the process of the present invention. The apparatus includes a power supply 26, a source of stressing voltage 28 and a source of clock signals 30 for phase 1 through phase 4. The supplies, stress voltage and clock signals are provided to an LSI device 32 which is to be stress tested. Power supply 26 and clocks 30 provide the operating voltages the device 32 would experience in the field. The supply 26 and clocks 30 are adapted to provide variable signals according to the application planned for a device under test. The stress voltage 28 is applied as an input to the initial logic element in a logic path. At all other logic elements in a logic path, the operating voltage 26 provides the stress voltage. The clock supply 30 may be four individual generators producing four non-overlapping pulses or one generator with delay lines providing the signals for transferring input data through a logic chain. If several devices 32 are stressed in parallel, the supply 30 is adapted to drive the large capacitance load presented by the devices. The device 32 is connected to the supplies 26, 28 and 30 as shown in FIG. 2. The supply 26 is connected to the respective drain electrodes of the precharge devices 20 in each of the four types of logic circuits. The supply 28 is connected to the input of the initial logic element (type 1 logic circuit in FIG. 2). The clock signals 30 are connected to their assigned logic type.

The process of the invention involves turning on the supplies 26 and 28 and running the clock cycles in reverse order, that is phase 4 followed by phase 3, phase 2 and phase 1.

FIG. 4 shows the output voltage levels at nodes 'A', 'B', 'C' and 'D' for types 1, 2, 3 and 4, respectively logic circuits in FIG. 2. FIG. 4 represents node voltage levels after one phase cycle has been completed. As phase 4 turns on, the output node at 'D' is charged "high" because phase 1 is off. When phase 3 turns on and phase 4 turns off, the node 'C' is charged "high" while node 'D' remains "high". Since type 1 circuits can be driven only by nodes like 'C' and/or 'D' and/or input nodes like (I) which are held "high" it means that during the time phase 3 is on, all logic inputs of all type 1 circuits on the device are turned on. Now when phase 3 turns off and phase 2 turns on, node 'B' will go "high" and all type 1 circuits on the device will discharge simultaneously and cause the node 'A' to go "low". At this point all logic gate electrodes of all type 1 circuits are fully turned on and thereby fully stressed. It should be noted that stressing is true regardless of the composition of the type 1 logic element, that is, the element may perform either an and/or function. Node 'D' is still "high" and so are the inputs to the type 4 circuit. When phase 2 turns off and phase 1 turns on, all type 4 circuits on the device discharge simultaneously and node 'D' goes "low". Thus during the presence of phase 1, all the type 4 logic gate electrodes are fully stressed. In a similar manner, the presence of phase 4, phase 3 stresses the gates of type 3 and type 2 circuits respectively.

In every cycle of four phases, therefore, all internal FET logic gates (including the ones driven directly by the clock, that is precharge and discharge gates) are accessed and stressed once. The duty cycle of stressing is exactly 25 percent. In previous stressing processes for random logic the duty cycle is not definable and thus no full measure of stress is available. Moreover, no input test pattern is required and all gates are stressed. The process applies regardless of the number of circuits on a chip and the stressing is fully deterministic and repeatable even though the logic is combinatorial, sequential.

Figure 5:
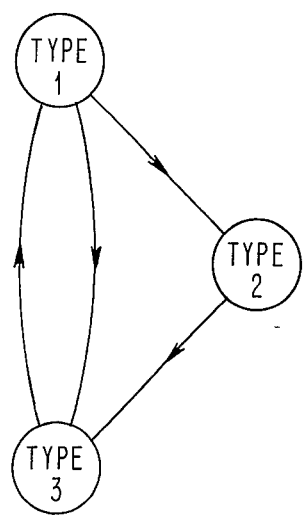
FIGS. 5 and 6 are diagrams for connecting combinations of circuits, different than those shown in FIG. 3, to perform random logic functions.
Figure 6:
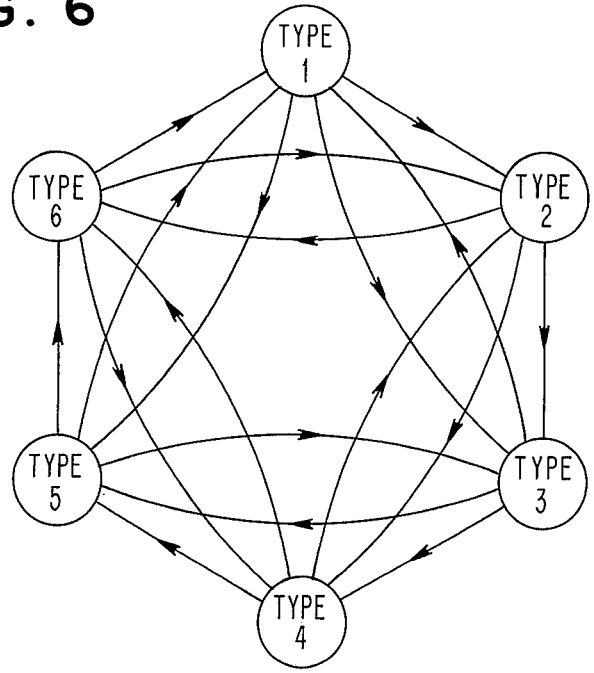

While the invention has been described with respect to four phase logic circuits, the invention is also applicable to other systems, e.g., the three phase systems, six phase systems, etc., shown in FIGS. 5 and 6, so long as the interconnect ground rules are the same as shown in FIG. 3. In case of three phase systems, the ground rules are as shown in FIG. 5. In case of six phase systems, the ground rules are as shown in FIG. 6.

While the invention has been particularly shown and described with reference to preferred embodiments, it will be understood by those skilled in the art that the foregoing and other changes in form and detail may be made without departing from the spirit and scope of the invention.

What is claimed is:

1. In a testing process for dynamic, random logic FET circuit arrays without the use of test patterns comprising the steps of
   a. providing a plurality of clock phases to each dynamic, random logic FET circuit in an array under test, the clock phases having a prescribed time relation to one another to transfer information through the array of logic circuits,
   b. providing operating potentials to each random logic FET circuit under test, c. providing an initial stress voltage to each random logic FET circuit in the array adapted to receive a data input, d. and cycling the clock phases in reverse order to the prescribed time relation for transferring information through the array of logic circuits.

2. The invention of claim 1 wherein each FET logic circuit comprises a plurality of gating elements and the process further comprises the steps of a. providing sets of clock pulses to the gating elements in a logic circuit.

3. The invention of claim 2 wherein each logic circuit is characterized by a type number and the process further comprises the steps of a. providing different combinations of clock pulses to each logic circuit.

4. The invention of claim 3 wherein each FET device in a logic circuit includes a gate electrode and the process further comprises the steps of a. defining a plurality of logic types for the transfer of information through a logic circuit, b. and stressing gate electrodes for each FET device in a logic circuit as the clock phases are applied in reverse order.

5. The invention of claim 4 wherein the plurality is three logic types for the transfer of information through a logic circuit.

6. The invention of claim 4 wherein the plurality is four logic types for the transfer of information through a logic circuit.

7. The invention of claim 4 wherein the plurality is six logic types for the transfer of information through a logic circuit.

* * * * *